United States Patent [19]
Quéveau

[11] 4,157,845
[45] Jun. 12, 1979

[54] RETRACTABLE ROOF SYSTEM FOR MOTORCARS

[75] Inventor: Gerard Quéveau, Cerlsay, France

[73] Assignee: S.A. Louis Heuliez, Cerizay, France

[21] Appl. No.: 823,700

[22] Filed: Aug. 11, 1977

Related U.S. Application Data

[63] Continuation-in-part of Ser. No. 769,559, Feb. 17, 1977, abandoned, and a continuation-in-part of Ser. No. 801,354, May 27, 1977, abandoned.

[30] Foreign Application Priority Data

May 31, 1976 [FR] France ................. 76 16427
Feb. 11, 1977 [FR] France ................. 77 04009
May 6, 1977 [FR] France ................. 77 13925

[51] Int. Cl.² ............................................. B60J 7/04
[52] U.S. Cl. ............................ 296/137 D; 160/188
[58] Field of Search .......... 296/137 B, 137 E, 137 C, 296/137 D; 160/209, 188; 49/41, 495

[56] References Cited
U.S. PATENT DOCUMENTS

| | | | |
|---|---|---|---|
| 1,826,871 | 10/1931 | Ford | 296/137 C |
| 2,057,850 | 10/1936 | Sims | 160/188 |
| 2,861,836 | 11/1958 | Goeggel | 296/137 C |

FOREIGN PATENT DOCUMENTS

1377679 12/1974 United Kingdom ................. 296/137 B

Primary Examiner—Robert R. Song
Attorney, Agent, or Firm—Leydig, Voit, Osann, Mayer & Holt, Ltd.

[57] ABSTRACT

A retractable roof system for motor cars, said system comprising: a plurality of nesting shutters interconnected for movement between a nested position and an extended position in which each shutter overlaps an adjacent shutter and the outer surfaces of said shutters altogether define a substantially horizontal essentially continuous, stepped, extended surface, a pair of fixed guide members adjacent, respectively, the lateral margins of said extended surface, and followers attached to the shutters for cooperation with guide members to position the shutters so that said extended surface generally matches a desired surface for said roof system. The system includes interchannel sealing strips which inhibit the passage of wind and rain into the motor car and also serve to reduce vibration by compressing and maintaining spacing between the several shutters.

40 Claims, 21 Drawing Figures

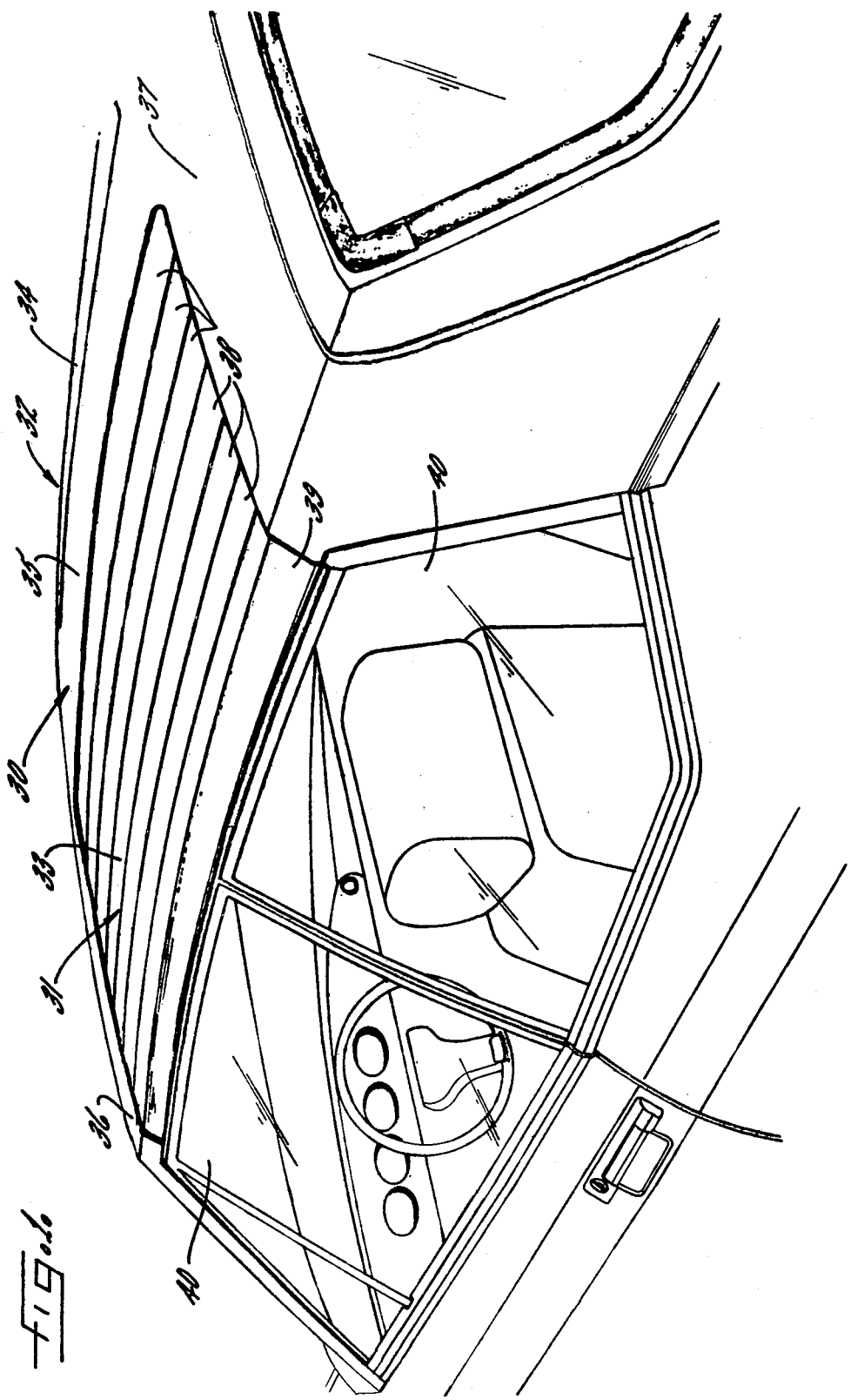

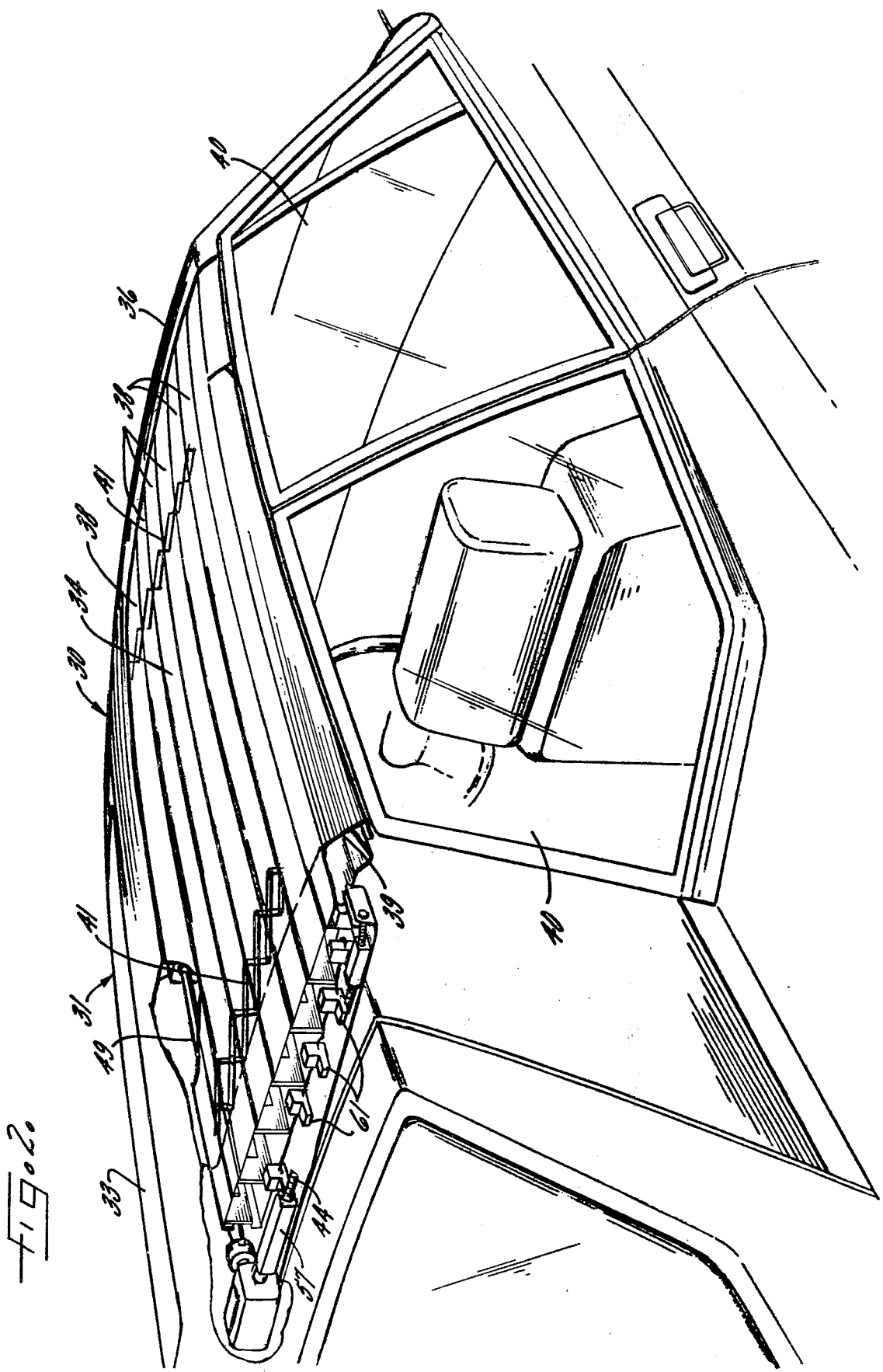

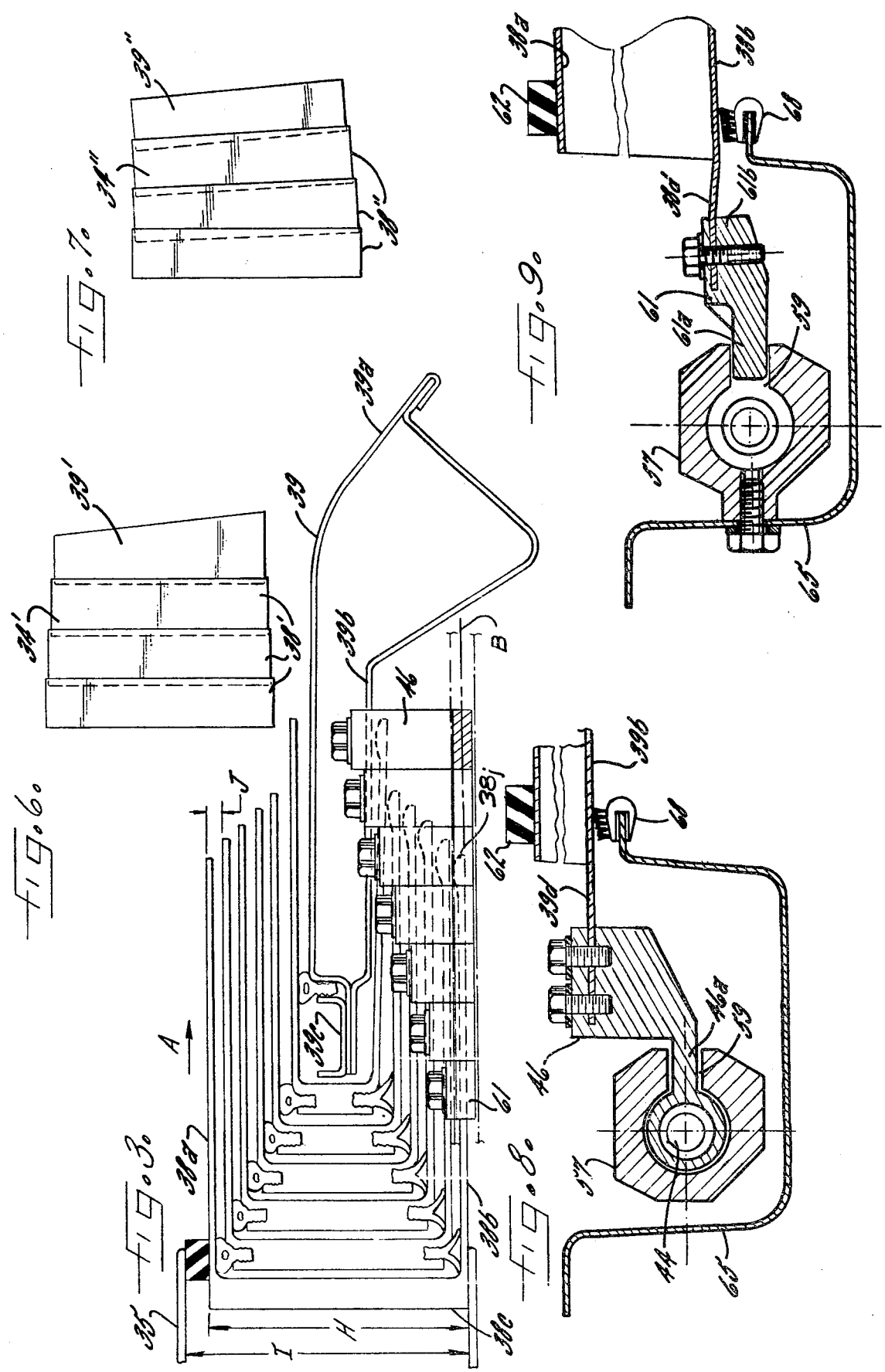

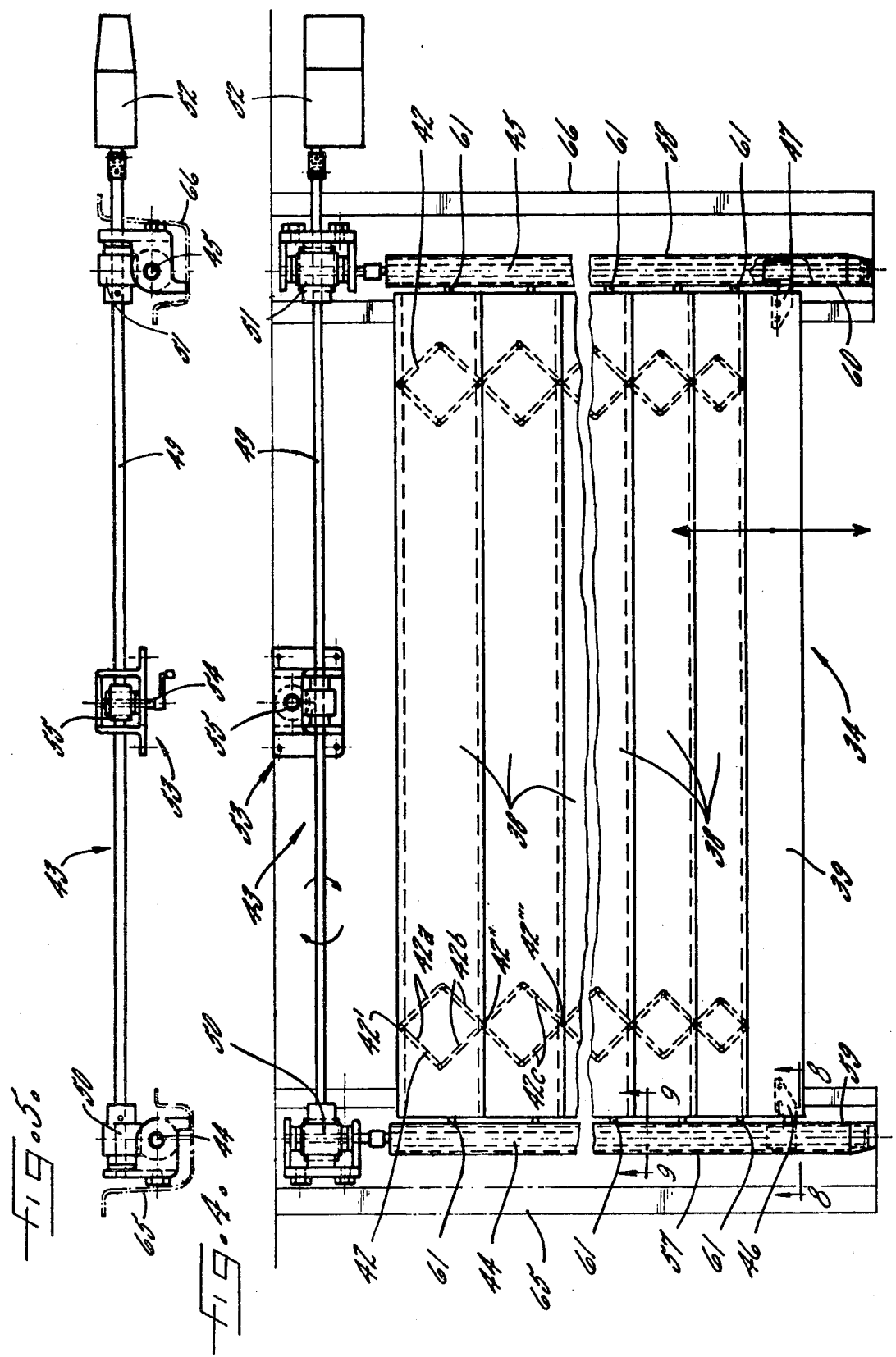

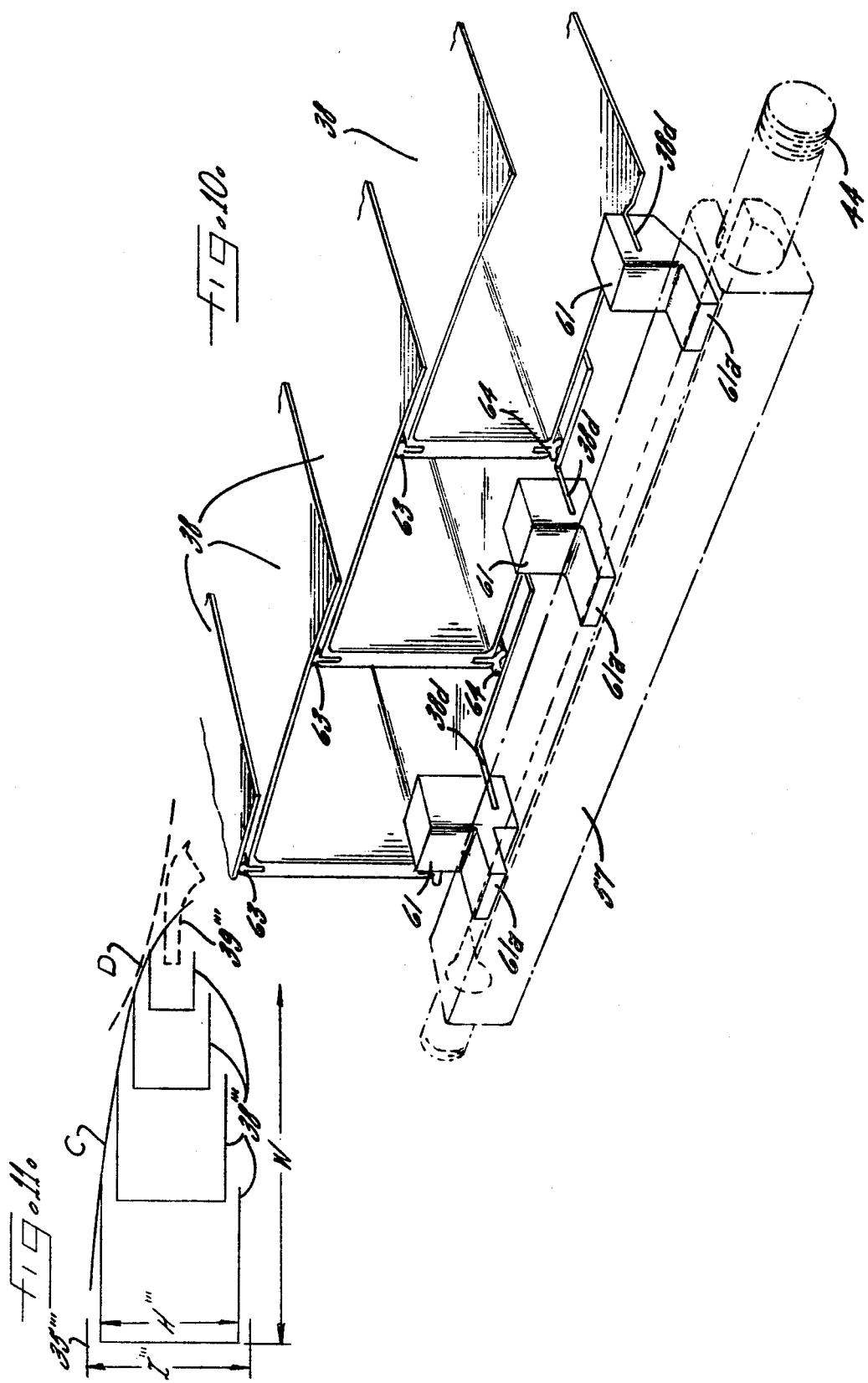

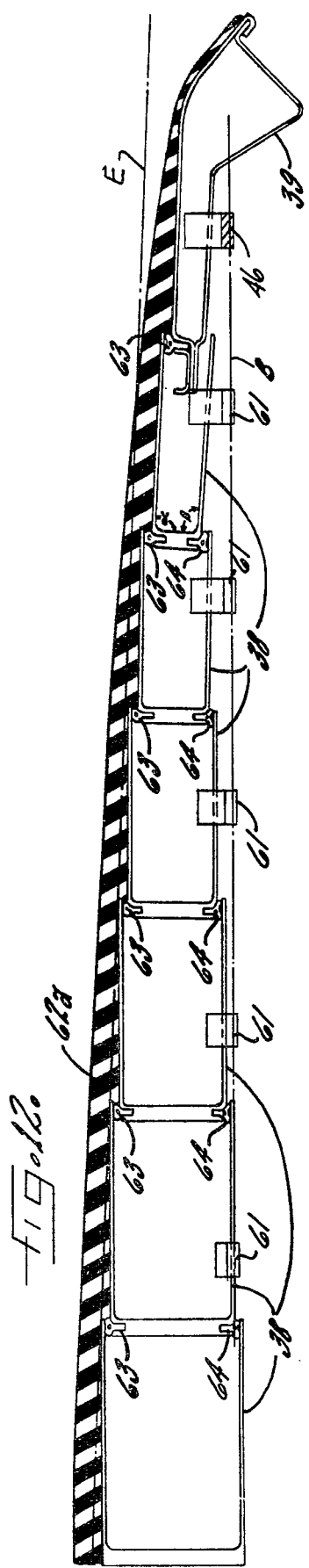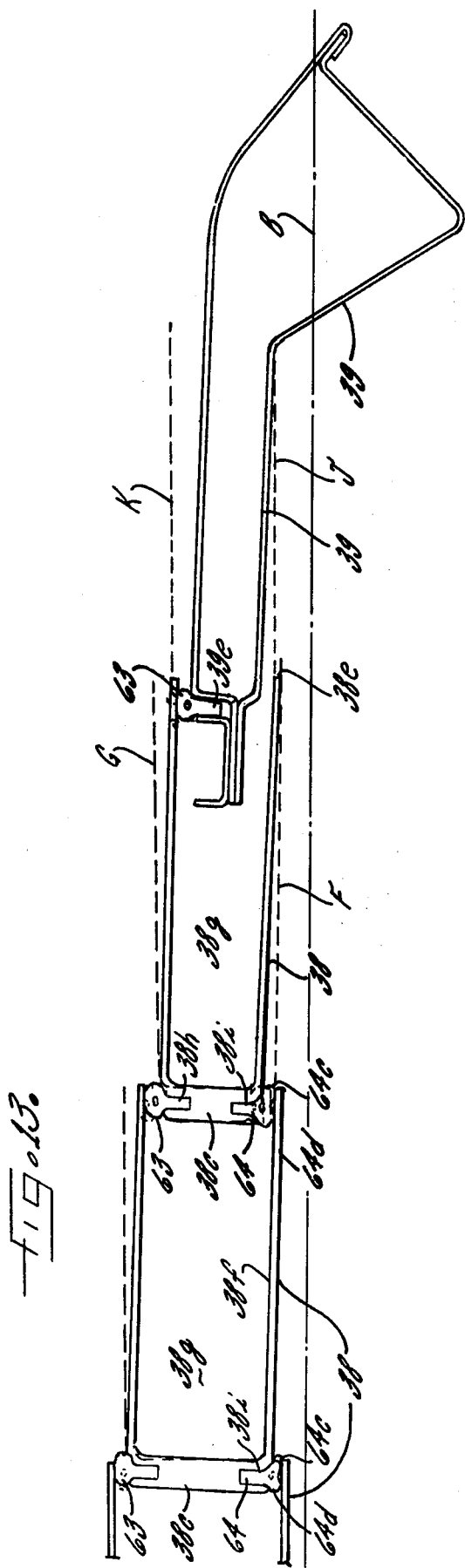

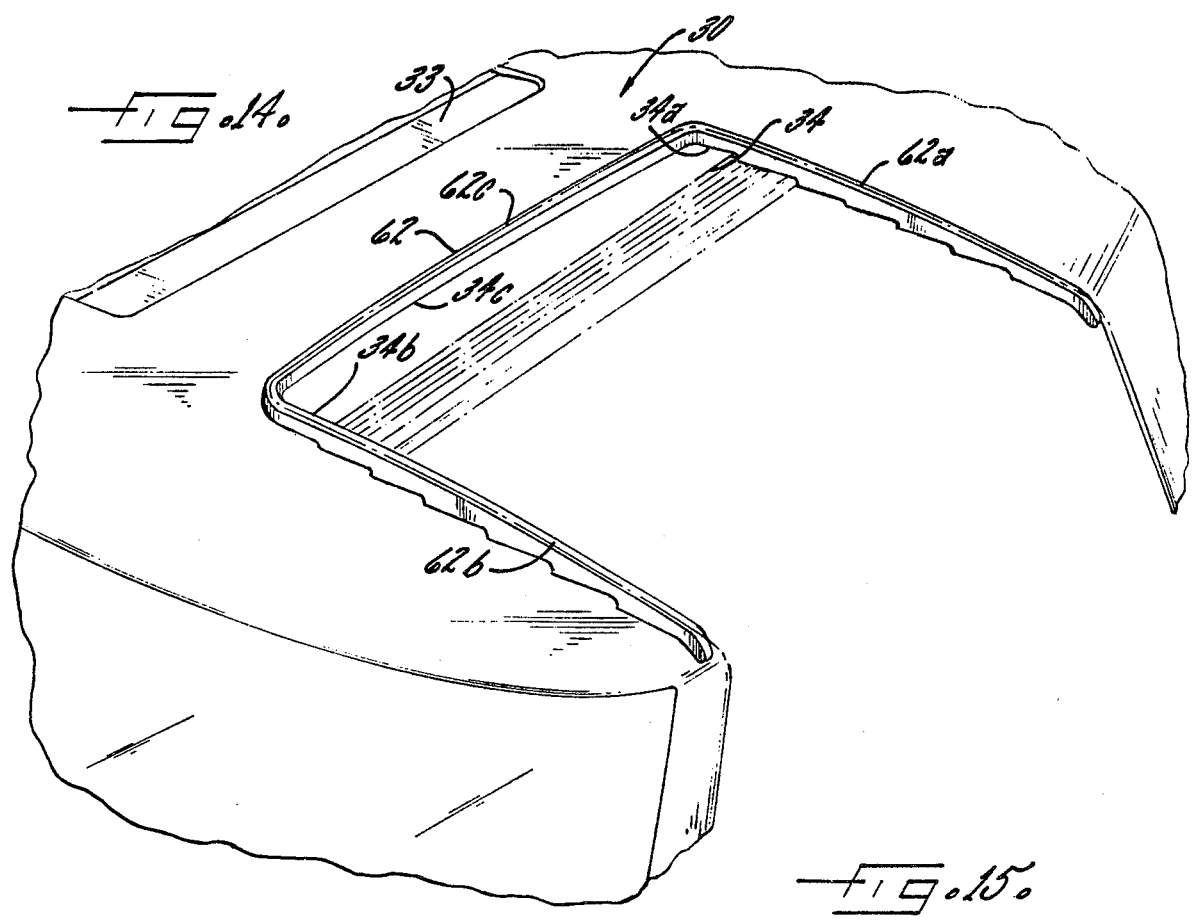
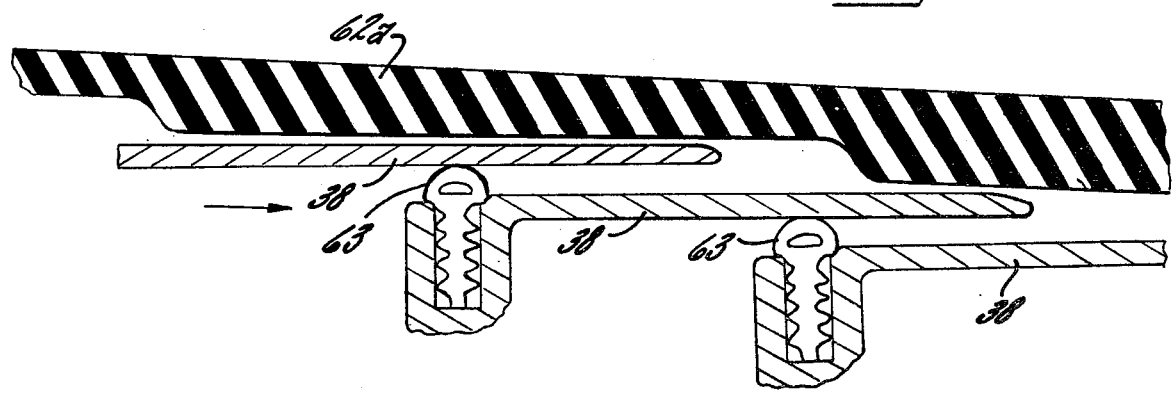
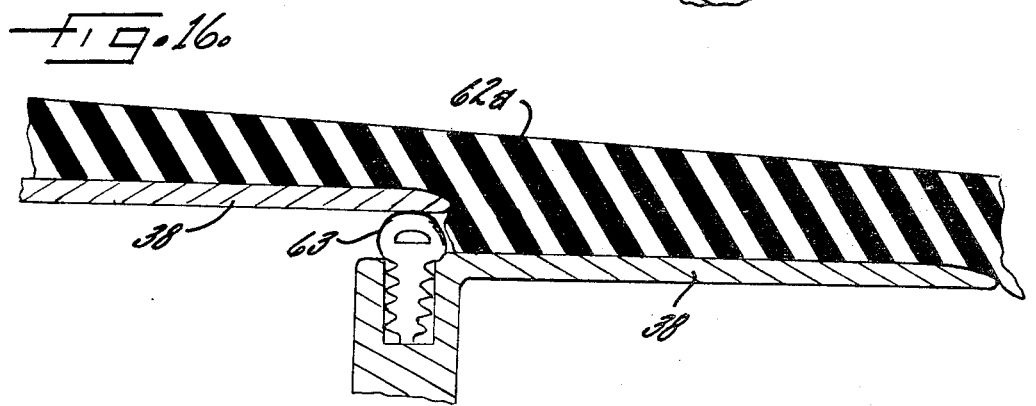

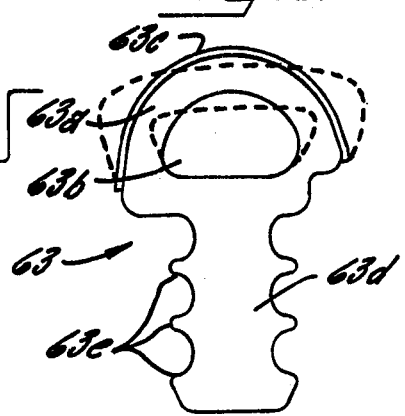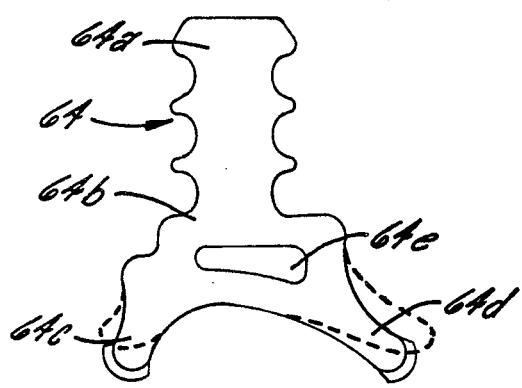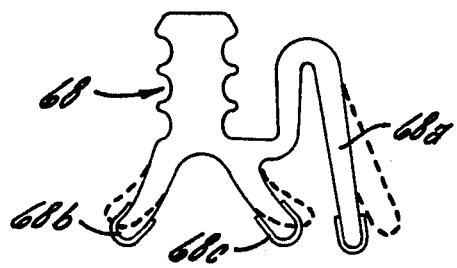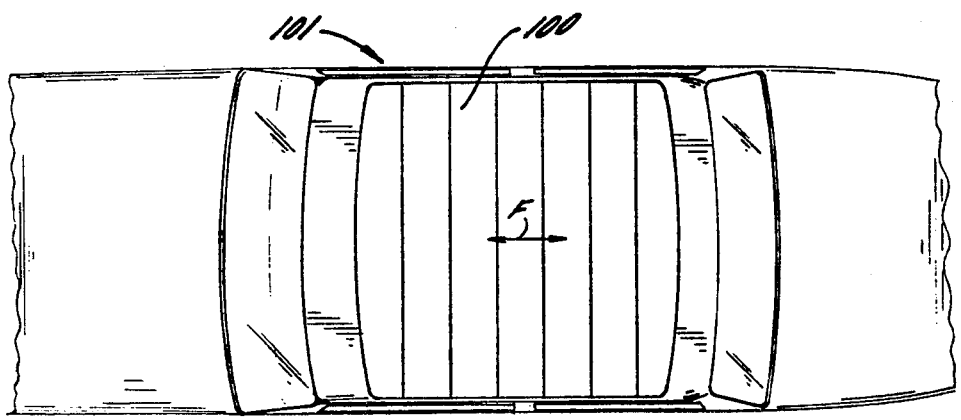

RETRACTABLE ROOF SYSTEM FOR MOTORCARS

REFERENCE TO RELATED APPLICATIONS

This application is a continuation in part of Ser. No. 769,559 filed Feb. 17, 1977 and Ser. No. 801,354 filed May 27, 1977 both now abandoned.

The present invention relates to retractable panel structures, and more particularly, to retractable roofs for motor cars.

It is often considered desirable to retract (including possibly even remove) at least a portion of theroof of a motor car to enjoy favorable weather conditions and, especially, in the case of small motor cars, to facilitate entering and leaving the vehicle. Among the important considerations with any retractable roof is that the sealing means where the retractable roof joins the structure of the motor car be effectively impervious to wind and moisture. Further, the elements of the retractable roof should not rattle or otherwise generate or admit noise.

Another major consideration is that a large amount of roof opening be provided to obtain the maximum benefit of having a retractable roof. An additional, and in some ways competing, consideration is that the roof, consisting of the retractable or removable portion along with any stationary portion, should offer sufficient structural support and penetration resistance in the event of an accident. For decades, fabric-over-folding-framework "convertible" roofs found widespread use. While this type of roof folds compactly, removing the entire roof of the motor car, it lacks significant structural support and penetration resistance when up and, necessarily, is entirely devoid of either when down.

Removable rigid motor car roofs, while permitting removal of the entire motor car roof and offering a certain degree of structural support when in position, offer no protection whatever when removed. Further, the bulk thereof creates storage and handling problems.

Removable or retractable rigid panels, comprising only a portion of the motor car roof, have been employed to permit a certain degree of opening while retaining a relatively high degree of structural support even with the panels removed. The bulk of the panels is directly tied to the size of the opening, such that the latter may be limited by the storage and handling capabilities. One known configuration facilitating a rather large degree of opening employs a pair of removable panels in conjunction with a so-called T-bar arrangement. In this arrangement, a stationary part of the roof, generally in the form of a T, cooperates with a removable panel above the driver's seat and another symmetrically positioned above the passenger's seat to provide a rigid roof with the panels in place and a partially open roof with the panels removed. This configuration has the advantage of providing a substantially open roof above the driver's and passenger's seats, with only a central bar connecting the rear and forward stationary portions of the roof. The configuration of the stationary portion of the roof lends itself to reinforcement with considerable structural support. Further, access to and from the vehicle is enhanced when the doors are opened with the panels removed. A disadvantage experienced with this type of configuration of rigid panel, however, is that the panels must be stowed while removed. Further, as a limitation on the convenience of removable rigid panels in general, the removal and replacement of the panels may require that the vehicle be stopped and, possibly, that the operator be out of the vehicle.

A second type of rigid roof panel which has been employed forms a central portion of a motor car roof and retracts into a cavity between the exterior and interior surfaces of a stationary portion of the roof. While such an arrangement has the advantage of avoiding the storage and handling problems discussed above in connection with the removable panels, a disadvantage is that a retractable panel is necessarily limited in size to one-half the surface of the roof. Further, the curvature of the roof may restrict the portion of the roof which may be retracted into an adjacent portion.

A type of retractable roof panel which achieves a large opening, provides structural support and penetration resistance, and which also overcomes the disadvantages of many of the rigid panels discussed above, is disclosed in French Pat. No. 71.36014 and the first patent of addition thereto French Pat. No. 72.05633, both assigned to the assignee of this application. In these patents there is disclosed a retractable multi-component panel comprising a series of progressively sized interconnected channel-shaped shutters which extend to form a panel and telescope or "nest" with one another to create an opening in, for example, the roof of a motor car. In an embodiment disclosed in the patents, two panels are employed in a configuration similar to the T-bar arrangement described above.

The apparatus disclosed in the referenced French patents are, however, subject to some disadvantages. As explained in detail in the description of the invention which follows, in order to create an aesthetically pleasing appearance, it is desirable that any roof panel, including the general type disclosed in the French patents, when extended conform resonably closely to the contours of the roof in which it is installed. To this end French Pat. No. 72.05633 discloses the employment of a curved guide rail upon which the shutters slide and rest to conform the lateral, downward curvature of the extended panel to that of the adjacent stationary part of the roof. The lateral, downward roof curvatures vary somewhat from motor car to motor car, however and even from location to location within a given roof, with the result that although a standard panel assembly might be adaptable for use with a variety of different motor cars, the guide rails might have to be individualized for each different model. In the interest of uniformity in manufacturing, it would be advantageous to avoid the necessity for individualized side rails and instead permit the use of interchangeable components from one model car to another.

Further, motor car roofs often have a certain degree of what will be called longitudinal curvature, that is, curvature from the front to the rear of a motor car roof. The referenced patents have no provision for such longitudinal curvature, in fact, the particular longitudinal inter-shutter sealing arrangement could not accommodate any significant amount of longitudinal curvature. The inter-shutter sealing arrangement mentioned above is also subject to some other disadvantages. It is a delicate one involving a thin water proof membrane connected between adjacent shutters. It has been found that this type of membrane is subject to detachment of the membrane from the shutters, aging and fatigue of the membrane material, and damage to the membrane through binding or pinching between shutters. Further, in order to assure clearance for the membrane, it is necessary to leave a slight gap between the successive shutters. Under some driving and wind conditions this gap can lead to noise-generating "flutter" of the shutters.

The collapsible roof panel system according to the present invention overcomes the aforementioned problems of known retractable roofs and panels in general and also specifically the retractable panels disclosed in the referenced French patents.

It is a primary object of the present invention to provide a retractable roof panel system having a substantially standard guide and drive system which may be installed in a variety of models of motor cars.

With more particularity, it is an object of the present invention to provide a retractable roof panel system which may be adapted to conform to roof curvatures of a variety of model cars, by reason of the guide system which provides a datum or reference plane relative to which the panels of the roof system are positioned by the guide and drive system in such a fashion as to match a flat or curved surface, as desired.

Another object of the present invention is to provide a more flexible, effective, and reliable sealing system to exclude moisture and to reduce noise generation in retractable roof panel systems utilizing telescoping shutters.

More specifically, an object of the present invention is to provide such a sealing system which can accommodate both lateral and longitudinal curvature of the roof panel structure, and which provides at least a two stage moisture seal and maintains shutter-to-shutter spacing to reduce vibration.

Yet another object of the present invention is to provide a dependable and reliable power drive system for operating a retractable roof panel system for vehicles.

A further object of the present invention is to provide such a roof panel system which permits free travel of the nested and extended positions while securing the components in either the nested or extended positions, or in positions therebetween, to reduce vibrations and rattling.

Other objects and advantages of the present invention will become apparent upon reading the following detailed description and upon reference to the drawings, in which:

FIG. 1 is a perspective view of a motor car equipped with a roof panel system according to the present invention;

FIG. 2 is a perspective view similar to that in FIG. 1 in which some of the elements are removed or fragmented to illustrate the arrangement of the roof panel system according to the present invention;

FIG. 3 is a side view of the shutters in the nested condition;

FIG. 4 is a plan view of a roof panel and drive assembly according to the present invention;

FIG. 5 is a sectional view of a roof panel and drive assembly taken along lines 5—5 of FIG. 4;

FIG. 6 is a plan view of one embodiment of a trapezoidal roof panel system;

FIG. 7 is a plan view of a further embodiment of a trapezoidal roof panel system;

FIG. 8 is a sectional view taken along lines 8—8 in FIG. 4;

FIG. 9 is a sectional view taken along lines 9—9 of FIG. 4;

FIG. 10 is an enlarged perspective view of a portion of the roof panel shown in FIG. 2;

FIG. 11 is a schematic illustration of the effect on lateral downward curvature of incrementally narrowing successively outboard shutters;

FIG. 12 is a sectional view of a roof panel having the panel members extended;

FIG. 13 is an enlarged sectional view of the outboard panel members of FIG. 12 illustrating their oblique deviation from the datum plane provided by the guide members in order to conform to a representative motor car roof curvature;

FIG. 14 is a perspective view of a peripheral gasket in a motor car roof with the retractable panel retracted;

FIG. 15 is a view of partially extended shutters and the peripheral gasket;

FIG. 16 is a view similar to that in FIG. 8 showing the shutters fully extended and sealed against the gasket;

FIG. 17 is a cross section of the seal employed between the upper exterior surface of one shutter and the lower interior surface of the shutter in which the former rests;

FIG. 18 is a cross section of a seal employed between the lower exterior surface of one shutter and the upper interior surface of the shutter in which the former nests;

FIG. 19 is a cross section of a further embodiment of a seal employed between the lower exterior surface of one shutter and the upper interior surface of the shutter in which it nests;

FIG. 20 is a sectional schematic of a longitudinally curved set of nested shutters.

FIG. 21 is a plan view of a collapsible panel system according to the present invention employed as a single central, rearward opening panel in the roof of a motor car.

While the invention will be described in connection with preferred embodiments, it will be understood that I do not intend to limit the invention to these embodiments. On the contrary, I intend to cover all alternatives, modifications and equivalents as may be included within the spirit and scope of the invention as defined in the appended claims.

Turning to FIG. 1 there is shown a roof 30 of a motor car with two retractable panel systems 31 and 32 according to the present invention installed therein in what is sometimes referred to as a T-bar configuration, discussed above. The panels 33 and 34 are shown in the extended position, forming portions of the motor car roof 30. In the embodiment shown, the panel systems 31 and 32 according to the present invention offers several significant advantages over both rigid panels and the retractable panel systems disclosed in the referenced French patents. These advantages will be discussed in the course of the detailed description which follows.

The two panel systems 31 and 32 shown are symmetrical to one another, with each of the panels 33 and 34 retracting toward the stationary bar member 35 extending along the center line of the roof and bordered on its lateral margins by transverse front and rear roof portions 36 and 37. Only the panel system 32 is discussed in detail below, it being understood that the second panel system 31 is identical in construction and operation except for its opposite orientation.

Referring now to FIG. 2, this view shows the panel system 32 with some of the components of the stationary roof and the retractable panel removed or fragmented to more clearly illustrate the configuration of the panel system. In order to simplify and maintain consistency in the discussion of the panel system and its operation which follows, the portion of the panel system 32 at the center of the roof 30 will be referred to as the inboard portion, while that portion at the side of the roof which interfaces with the motor car side windows 40 will be referred to as the outboard portion.

According to the invention, the panel 34 consists of a plurality of shutters 38. In the embodiment shown, as best illustrated in FIG. 3, the inboard shutters are generally in the form of C-shaped channels, have parallel top and bottom portions 38a and 38b, respectively, with a connecting inboard heel portion 38c. In addition, an outboard transition shutter 39 which provides the interface between the side windows 40 (FIGS. 1 and 2) and the panel is specially configured. This configuration is dependent to a large extent upon the specific roof contour required and the side window and/or door arrangement.

In order to permit the retraction in the panel and the creation of the desired opening in the motor car roof, the sizing of the shutters is coordinated such that from the inboard shutter outward in the direction of the arrow A (FIG. 3), shutters 38 are successively thinner (except for the outermost portion 39a of the transition shutter) to permit telescopic-type "nesting" action of each shutter into the next preceeding one.

Shutters fabricated from aluminum alloys have given highly satisfactory results. The use of aluminum offers not only a strong, lightweight panel but also permits fabrication through extrusion. An additional feature of aluminum shutters is that they may be anodized to coordinate the color of the panel with that of the motor car with a permanent and durable surface treatment. Further, it has been found that the anodization of the shutter surfaces significantly reduces the sliding friction of the roof panel system.

Turning now to a consideration of the means by which the panel is operated between its retracted and extended positions, as shown in FIG. 4, the several shutters 38 are interconnected with connecting mechanisms 42. Mechanisms of this type are disclosed in French patent of addition No. 72,05633, referenced above. The mechanisms 42 consist of a series of interconnected, pivoted paired arms, e.g. 42a, 42b and 42c, substantially forming aligned parallelograms successively connected at opposite vertices, e.g. 42', 42" and 42'''. In the embodiment shown, the successive vertices are pinned to the inboard heel portions of the successive channel-shaped shutters 38 and to a specially configured inboard portion 39c of the transition shutter 39 (see FIG. 3).

As may be seen in FIG. 3, while top and bottom portions 38a and 38b, respectively, of the shutters 38 are relatively thin to minimize the overall height H of the panel, the heel portions 38c are somewhat thicker to accommodate the interconnection to the mechanisms 42.

Describing the operation of the mechanisms 42, by virtue of the geometrically similar substantial parallelograms formed by the paired arms 42a, etc., the vertices 42', etc. and, consequently, the shutters 38, uniformly advance by amounts proportional to the lengths of the paired arms. As will be discussed in detail below, the widths of the shutters 38 and the relative advancements thereof are factors in the lateral downward curvature profile which may be achieved when the panel 34 is extended. Accordingly, the sizing of the paired arms 42a, etc., of the mechanisms 42 is dependent to a certain extent upon the desired curvature profile.

According to an aspect of the invention, a drive system 43 for extending and retracting the roof panel 34 is illustrated. In this regard, it is noted that U.S. application Ser. No. 769,559, filed Feb. 17, 1977 and U.S. application Ser. No. 801,354, filed May 27, 1977, both now abandoned, disclose flexible belt drive systems employing a flexible belt at each lateral margin of a retractable roof panel, the belts being operated synchronously by a common motor-driven shaft. In the embodiment illustrated in FIG. 4, a pair of lead screws 44 and 45 are employed in conjunction with threaded actuators 46 and 47 attached to each end of the transition shutter 39 to positively move the panel 34. The rotation of the lead screws 44 and 45 causes the actuators 46 and 47 to translate along the lead screws, resulting in the extension or retraction of the panel 34, depending upon the direction of rotation of the lead screws. As explained above, the mechanims 42 assure the uniform, proportional extension and retraction of the several individual channels 38.

Referring to FIGS. 2 and 4-5, a common drive shaft 49 oriented along the stationary center bar 35 of the motor car roof 30 and perpendicular to the lead screws 44 and 45 serves to drive the lead screws through, e.g., helical or bevel gear systems 50 and 51. If necessary, the drive shaft 49 may be provided with one or more flexible couplings (not shown) to accommodate any longitudinal curvature of the center bar 35. In the embodiment shown, both power and manual inputs are illustrated. The power input comprises an electric motor-reducer 52 which receives current from the electrical system of the motor car. The manual input 53, primarily for use in the event of the inoperability of the power input, comprises a hand-operated crank 54 which effects the rotation of the drive shaft 49 through, e.g., a helical or bevel gear system 55.

It will be appreciated that with lead screws 44 and 45 of the same thread pitch and operating at the same rotational speed, each end of the transition shutter 39 will be advanced at the same rate. Accordingly, with geometrically congruent mechanisms 42 and uniform width shutters 38 and 39, the retractable panel 34, in each of its extended, intermediate and retracted positions, will be generally rectangular. Should it be desired to form a trapezoidal roof panel, however, several options are available. Referring to FIG. 6, one such option would simply be for the transition shutter 39, to be trapezoidal, with the other components being unchanged from those for a rectangular panel as described above. This arrangement would result in a panel 34' of trapezoidal shape in each of the extended, intermediate and retracted positions. (See the dotted lines in FIG. 6) An alternative arrangement for obtaining a trapezoidal roof panel would be for the lead screws to be driven at different speeds or have different pitches, or both, such that the actuators advance at different rates for different distances. The shutters could be individually trapezoidal in shape, with the mechanisms 42 being geometrically similar but not necessarily congruent. Or, as shown in FIG. 7, so long as the lead screws advance the actuators (not shown) differently, even with uniform width shutters 38" and 39" and geometrically congruent mechanisms (not shown), the panel 34' will "fan out" from its rectangular nested position and become increasingly trapezoidal as it extends into its final position.

Returning to a consideration of the operation of the panel system 32 according to the present invention, guide means fixed relative to the stationary portion of the motor car roof are provided to guide the shutters between their nested and extended positions. In the system illustrated, the guide means include guide members 57 and 58. As mentioned above, the transition shutter 39 is driven by the lead screws 44 and 45 via the actuators 46 and 47. The guide members 57 and 58 encompass the lead screws 44 and 45, and provide linear, facing guide slots 59 and 60 the center lines of which lie in a datum or reference plane. The edge of this plane is shown as line B in FIG. 3. It is an important feature of the invention that the guide means provide this datum plane for reference in matching the longitudinally and laterally curved surface provided by the shutters to the actual curvature of the vehicle roof in which the roof system is to be installed.

FIG. 8 shows the relationship between the guide slot 59 and the intermediate section 46a of the actuactor 46. A similar arrangement is employed to guide the intermediate shutters 38. Referring to FIG. 9, which shows an arrangement typical of both ends of an intermediate shutter 38, a follower 61 is attached to the bottom portion 38b of the shutter. The follower 61 is generally similar in configuration to the actuators 46 and 47 except for the lack of connection with the leas screws 44 and 45. In operation the followers 61 slide along guide slots 59 as the shutters 38 and 39 move between their nested and extended positions. The following and/or guide members may be fabricated from a plastic material having a low friction coefficient and wear resistant properties to offer the advantages of low internal friction and longevity.

As explained above, it is a feature of the present invention that the shutters 38 and 39 be movable between a retracted position and an extended position. To this end, referring again to FIG. 3, the relative elevations of the torque 61a of the followers 61 must be such that they both hold the shutters at the proper elevation relative to the datum or reference plane when extended and also permit the several shutters 38 and 39 to nest properly. Accordingly, while the tongues 61a of the followers 61 must, by definition, lie in substantially the same plane, the points of attachment 61b to the shutters 38 are stepped to compensate for the variation in the elevations of the bottom portions 38b of successive shutters 38. Further, as shown in FIG. 3, the lateral positions along the bottom portions 38b of the followers 61 must be coordinated to accommodate the nesting. FIG. 10 illustrates several shutters 38 in a partially extended condition.

According to an important aspect of the present invention, the guide slots 59 and 60 in the guide members 47 and 58 may be linear notwithstanding the fact that the panel 34 in its extended position may have a slight surface contour to match that of the roof 30 in which the panel is installed. Through this arrangement, the panel system according to the present invention has the advantage of permitting a substantially standard guide and drive system to be employed regardless of the specific nature of the roof contour to which the panel surface must conform.

It should be noted that the nature of the surface contour of most motor car roofs is generally similar, with the roof surface being substantially horizontal with a radius of curvature in the transverse direction of, typically, on the order of 5 meters. While this degree of curvature may be considered to be relatively slight, it is nevertheless a visible one. It is especially noticeable when a panel having a lesser degree of curvature is installed in a motor car roof. In such a case, the panel of lesser curvature may even appear to be slightly concave. In terms of aestetics, this appearance may be viewed as detrimental. Therefore, notwithstanding the relatively slight degree of curvature typically present in motor car roofs, it is important that a roof panel include a degree of curvature comparable to that of the stationary portion of the roof.

A surface contour may be introduced into the retractable roof panel system according to the present invention by two mechanisms. In accordance with one aspect of the present invention, a slightly curved profile may be achieved by progressively shortening the successively outboard shutters. By so doing, even with an extension of the vertical centerlines of the shutters along a substantially horizontal line, the profile defined by the upper leading edges of the shutters will be slightly curved downward. This geometric characteristic is shown schematically exaggerated in FIG. 11 wherein each of the successively outboard shutters 38''' is an incremental amount shorter than the next inboard shutter. The result of this successive shortening is that the line C connecting the upper leading edges of each of the successive shutters 38''' is arcuate, increasing in curvature as the shutters get progressively shorter.

The degree of curvature achievable by decreasing the widths of the successive shutters as described above is limited by a number of factors. One limitation is the width W to which the panel must extend. It will be appreciated that given an overall panel width requirement, the narrower the individual shutters are, the more of them there must be to cover the required width. Increasing the number of shutters increases the complexity of the apparatus, the surfaces to be sealed (see discussion below) etc. Further, as each shutter must nest within the next inboard shutter, the number of shutters has a direct bearing on the overall height H of the inboard shutters, which in turn affects the thickness I of the roof 30 along the center bar member 35. Finally, the interfacing requirements of the transition shutter 39 may necessitate extra length, as illustrated in FIG. 3. Without more, this extra length results in an undesirable concave profile (dotted line D in FIG. 11) with the panel in the extended position.

Referring again to FIGS. 8 and 9, the actuator 46 is connected to the lower surface 39b of the transition shutter 39 and the follower 61 to the bottom portion 38b of the intermediate shutter 38 via tabs 39d and 38d, respectively, integral with and extending from the respective shutters. The cantilevered configuration of the tabs 39d and 38d provides a certain degree of resilience to permit some deflection of the shutters 39 and 38, respectively, from the positions they would assume in an unstressed condition (see the dotted lines in FIGS. 8 and 9). This flexing may compensate for minor manufacturing and assembly errors. Preferably the tabs should be designed so that any deflection of the shutters during a cycle of extension and retraction of panel does not exceed the elastic limits of the tabs. Observing this constraint will avoid the cyclic deformation and ultimate fatiguing of the tabs.

While deformation of the tabs 38d and 39d beyond their elastic limits is to be generally avoided for the reason given above, it is feature of the invention that a slight bending of the tabs may be employed to adjust the elevations of the shutters 38 and 39 upon the initial assembly and installation of the roof panel system 32 in a motor car. Such a final adjustment might be necessary, for example, due to variations in the fabrication and assembly of the roof panel system and/or the stationary portion of the motor car roof.

According to another aspect of the present invention the second mechanism by which a curved profile may be achieved is angularly orienting the outboard shutters such that their outer surfaces are oblique relative to the reference or datum plane B (see the discussion above).

FIG. 12 is a sectional view of an extended panel 34 according to the present invention having a profile conforming to a typical motor car surface contour. As illustrated by the line E drawn in FIG. 12 tangentially to the upper outboard edges of the shutters 38, only a limited amount of curvature need be introduced through the first few shutters. Thereafter the curvature increases to a maximum at the transition shutter 39.

The slight degree of curvature at the inboard portion of the panel 34 may be introduced through the mechanism of successively narrowing the shutters 38 (see discussion above). The increased amount of curvature required beyond the first shutters, however, requires the downward sloping of the shutters. FIG. 13 is an enlarged sectional view of the last several shutters illustrating the degree to which these components are sloped downward in FIG. 12 to match a typical motor car roof surface contour.

According to the invention, at least the outermost C-shaped shutter 38 is positioned obliquely relative to the datum plane B. In the embodiment shown, the outermost C-shaped shutter is constructed with top and bottom portions 38a and 38b sloping slightly downward, with the heel portion 38c being vertically oriented. Accordingly, the angle $\alpha$ is somewhat less than 90°, with the angle $\beta$ being somewhat greater than 90°, such that $\alpha$ and $\beta$ are geometrically supplementary. By maintaining the heel portion 38c in a vertical orientation, the mechanism 42 may be pinned thereto in the same manner as with the geometrically orthogonal shutters 38 and, furthermore, by maintaining a mutually parallel relationship between the heel portions 38c, a maximum compactness in the nested position may be achieved.

The limitation in the degree of slope which may be achieved for a given shutter is defined by the linear projection of the interior surfaces of the next inboard shutter parallel to the reference plane. As illustrated in FIG. 13, by maintaining the outermost portion 38e of the shutter within the projection of the next inboard shutters (dotted lines F and G), the obliquely oriented shutter may be freely retracted into the next inboard shutter. Further, by minimizing the thickness of any shutter to be sloped, the allowable degree of slope may be maximized. It will be appreciated, of course, that the requirement that any successive outboard shutters nest within an oblique shutter provides a limit in the minimum thickness of the shutter.

In the embodiment shown, the transition shutter 39 is similarly arranged obliquely to the reference plane. The slope obtainable with the transition shutter 39 is limited by the factors explained above, i.e. the portion which must nest within the next inboard shutter 38 must fall within the linear projection of the interior surfaces thereof, parallel to the reference plane (FIG. 13, dotted lines J and K).

According to another aspect of the invention, means are provided along the lateral margins of the roof panel to engage the shutters when extended to create a good seal to prevent the intrusion of wind and rain. The requirement for the seal are especially high at the rear of the panels illustrated in FIG. 1, in view of the air flow generated while the motor car is moving. Turning to FIG. 14, in the embodiment illustrated therein, the sealing means are in the form of U-shaped resilient gasket 62 fixed to the stationary portion of the roof and having its two legs 62a and 62b arranged along the lateral margins 34a and 34b of the panel 34, and its base portion 62c arranged longitudinally along the inboard margin 34c of the panel.

Referring again to FIG. 12 and also to FIG. 15, the lower surface of the gasket leg 62a is formed to correspond to the upper profile of the roof panel 34 when extended.

It is contemplated that the gasket 62 be resilient and designed to undergo a slight amount of compression when the panel 34 is extended to assure the generation of a tight seal.

It is another feature of the gasket 62 that the leading edged 38a of the shutters 38 deform the gasket slightly as the shutters seat in their fully extended positions (see FIG. 16), further assuring a good moisture seal. In view of the fact that the shutters are, essentially, wedged into position, a reduction in the vibration which might otherwise result is also achieved.

Turning now to a consideration of the inter-channel moisture sealing and vibration limiting provisions, according to the present invention elongated resilient sealing members are carried by each shutter for sliding engagement with the adjacent overlapping shutter. Referring again to FIG. 13, in the embodiment shown, these elongated resilient sealing members are upper and lower sealing strips 63 and 64, respectively, provided at the heel 38c of each channel-shaped shutter 38. In the case of the transition shutter 39, a single upper sealing strip 63 is provided at the upper surface thereof. Enlarged cross sections of the sealing strips 63 and 64 are shown in FIGS. 17 and 18. It is contemplated that each of these sealing strips 63 and 64 be extruded from a resilient material having wear resistant properties and able to withstand the range of temperatures to which motor cars equipped with panel systems according to the present invention might be subjected.

The sealing portion 63a of the upper sealing strip 63 (FIG. 17) is generally oval in cross section, with a hollow core 63b to facilitate deformation when in position (see the dotted lines in FIG. 17). Such deformation enhances the seal generated between the sealing strip surface 63c and the lower interior surface 38f of the next inboard shutter 38 to prevent the intrusion of moisture into the interior space 38g between the successive shutters 38. The compressed seal 63 also serves to maintain spacing between the shutters to reduce vibration and rattling.

The sealing strip 63 also comprises a depending connecting portion 63d having a series of formed ridges 63e designed to compress and secure the strip upon insertion into a slot 38h in the heel of a shutter 38 (slot 39e in the case of the transition shutter 39). This fastening arrangement creates a watertight seal to further guard against the intrusion of water into the interior space.

Referring to FIG. 4, gutters 65 and 66 are provided at the lateral ends of the shutters 38 and 39 to accept any water which might enter the space between two shutters. Provision (not shown) is made to drain water from the gutters 65 and 66 to the exterior of the motor car. Turning to FIGS. 8 and 9, a sealing member 68 is provided at the edge of the gutter beneath the shutters 38 and 39 to prevent the intrusion of moisture into the interior of the motor car.

The lower sealing strip 64 has a connecting portion 64a similar in configuration and operation to that of the upper sealing strip 63. This connecting position is designed to compress into and be secured in a slot 38i in the heel 38c of a shutter 38. The sealing portion of the lower sealing strip (FIG. 18) comprises two depending legs 64c and 64d. Through the assistance of a hollow core 64e, these legs are designed to compress and spread slightly while in position (see the dotted lines in FIG. 18). With the seal 64 in position, the legs 64c and 64d provide a two-stage sealing arrangement. As was the case with the upper sealing strip 63, the lower sealing strip 64 serves the additional purpose of maintaining spacing between the successive shutters 38 to reduce vibration and rattling.

In this regard, in keeping with the present invention, the lower interior surface 38g of each of the shutters 38 has an enlargement 38j thereon to assure a firm engagement of the leg 64d with the shutters 38 with the panel 34 in the extended position.

A further feature of the lower seal 64 illustrated in FIG. 18 is that, as a result of the relative angle between the leg 64d and the surface 38g upon which it rests, it serves as a squeegee to sweep any water from the interior of the shutter 38 when the panel 34 is retracted.

Referring to FIG. 19, a further lower seal embodiment 68 is illustrated. In this embodiment, a third leg 68a in addition to legs 68b and 68c, the functional equivalents of legs 64c and 64d, respectively, is provided to form yet another channel to confine water and direct it into the gutter 65 and 66. As with the embodiment shown in FIG. 8, this leg 68a also serves as a squeegee to sweep any water rearward and into the gutters 65 and 66 upon retraction of the panel 34.

An additional feature of the panel system according to the present invention is that, in addition to the capability of conforming to a roof surface contour through transverse curvature of the panel from the inboard shutters to the outboard shutters, the system can also accommodate a certain degree of longitudinal curvature, i.e., curvature from one lateral margin of the panel to the other along the length of the shutters. In view of the constraint that the shutters nest, it will be appreciated that the longitudinal curvature cannot vary substantially from shutter to shutter. This relationship is illustrated by the sectional schematic in FIG. 20 through a nested set of five longitudinally curved shutters 70. In addition to the advantage of permitting closer conformance to the roof surface contour than would be possible through transverse curvature alone, longitudinal curvature has the additional benefit of facilitating the flow of any water which might enter the interior spaces between successive shutters into the gutters 71 and 72 (see the discussion above on the drainage arrangement of the panel system 32).

An alternative embodiment of a collapsible roof panel according to the present invention is illustrated in FIG. 21. In this embodiment, a panel 100 is disposed in the central portion of the motor car roof 101 with the direction of extension and retraction of the panel being from front to back in the direction of arrow F. Drive and sealing means (not shown) similar to those employed in the dual panel T-bar arrangement discussed above are employed in the embodiment of FIG. 21 to operate the panel system.

I claim:

1. A retractable roof system for motor cars, said system comprising:
    a plurality of nesting shutters;
    means for guiding said shutters for movement between a nested position and an extended position in which each shutter overlaps an adjacent shutter and the outer surfaces of said shutters altogether define an essentially continuous, stepped, extended outer surface;
    said guiding means including a pair of fixed, substantially linear guide members adjacent, respectively, the lateral margins of said extended surface; and
    follower means attached to said shutters and positively guided through a substantially linear path by said guide members, said follower means also locating said shutters in their extended position so that said extended surface generally matches a flat or curved profile for said roof system as desired.

2. The retractable roof system for motor cars in claim 1, said shutters having a longitudinally curved contour.

3. The retractable roof system of claim 1, further comprising means to drive said shutters between said nested position and said extended position.

4. The retractable roof system of claim 3, said guiding means further comprising means to extend and retract the shutter members in a uniform fashion to prevent the binding thereof.

5. The retractable roof system of claim 4, said extension means comprising a plurality of inter-connected, pivoted paired arms substantially forming aligned parallelograms successively connected at opposite vertices, each of said connecting vertices being connected to one of said shutters to effect relative extension and retraction upon the driving of one of said shutters relative to another.

6. The retractable roof system of claim 1, at least some of said shutters comprising C-shaped channels.

7. The retractable roof system of claim 1, each of said fixed guide members having a guide slot therein, said follower means comprising shutter carried elements which slidingly engage said guide slots.

8. The retractable proof system of claim 1, said follower means positioning one or more of said shutters obliquely relative to said linear guide means yet within, substantially, the linear projection parallel to said guide members of the next inboard shutters in which said oblique shutters nest, so that the outer surfaces of said oblique shutters inpart a curvature to said extended surface and said oblique shutters return within the next inboard shutters completely in the nested position.

9. The retractable roof system of claim 1, including gasket means at the lateral margins engaging said extended surface and between said shutters, such that as said shutters are guided into said extended position, said gasket means slidingly engage said shutters in said extended position and seal said roof system.

10. The retractable roof system of claim 9, said gasket means including a gasket engaging said extended surface for mounting in a motor car roof.

11. The retractable roof system of claim 10, said gasket means forming a moisture tight seal between said shutters when said shutters are in the extended position.

12. A retractable roof system for motor cars, said system comprising:
    a plurality of nesting shutters;
    means for guiding said shutters for movement between a nested position and an extended position in which each shutter overlaps an adjacent shutter and the outer surfaces of said shutters altogether define a substantially horizontal essentially continuous, stepped, extended surface;

said guiding means including a pair of fixed guide members adjacent, respectively, the lateral margins of said extended surfaces;

follower means attached to said shutters and cooperating with said guide members to position said shutters so that said extended surface generally matches a desired surface for said roof system; and sealing means, including a pair of fixed, elongated, resilient members adjacent respectively, the lateral margins of said extended surface and engageable by the outer surfaces of said shutters when extended to provide a seal.

13. A retractable roof system for motor cars according to claim 12 wherein said pair of elongated, resilient members of said sealing means form the legs of a U-shaped sealing member, the base of which is fixed adjacent one longitudinal margin of said extended surface and sealingly engages the outer surface of one of said shutters.

14. A retractable roof system for motor cars according to claim 13 wherein said sealing means includes resilient sealing members carried by each shutter for engagement by an adjacent overlapping shutter to limit penetration of air and water through said extended surface.

15. A retractable roof system for motors cars, said system comprising:

a plurality of nesting shutters;

means for guiding said shutters for movement between a nested position and an extended position in which each shutter overlaps an adjacent shutter and the outer surfaces of said shutters altogether define an essentially continuous, stepped, extended surface;

said guiding means including a pair of fixed, substantially horizontal, guide members adjacent, respectively, the lateral margins of said extended surface;

follower means attached to said shutters and cooperating with said guide member to position said shutters so that said extended surface generally matches a substantially linear, desired surface for said roof system; and sealing means including a U-shaped resilient sealing member having a pair of elongated, resilient members which form the legs of said U-shaped sealing member fixed substantially horizontal and adjacent, respectively, the lateral margins of said extended surface, and engageable by the outer surfaces of said shutters when extended, and a resilient member which forms the base of said U-shaped sealing member fixed substantially horizontal and adjacent one longitudinal margin of said extended surface and sealing engaging the outer surface of one of said shutters;

said sealing means including separate, elongated, resilient sealing members carried by each shutter for sliding engagement with an adjacent overlapping shutter to limit penetration of air and water through any spaces between said shutters where they overlap.

16. A retractable roof system for motor cars, said system comprising:

a plurality of nesting shutters;

means for guiding said shutters for movement between a nested position and an extended position in which each shutter overlaps an adjacent shutter and the outer surfaces of said shutters altogether define an essentially continuous, stepped, extended surface;

said guiding means including a pair of fixed, substantially horizontal, guide members adjacent, respectively, the lateral margins of said extended surface;

follower means attached to said shutters and cooperating with said guide member to position said shutters so that said extended surface generally matches a substantially horizontal desired surface for said roof system; and sealing means including a U-shaped resilient sealing member fixed substantially horizontal and adjacent the lateral margins and one longitudinal margin of said extended surface, and engaging the outer surfaces of said shutters when extended; and separate, elongated resilient sealing members carried by each shutter for sliding engagement with an adjacent overlapping shutter to limit penetration of air and water thrugh any spaces between said shutters where they overlap.

17. A retractable roof system for motor cars, said system comprising:

a plurality of nesting shutters;

means for guiding said shutters for movement between a nested position and an extended position in which each shutter overlaps an adjacent shutter and the outer surfaces of said shutters altogether define a substantially horizontal, essentially continuous stepped, extended surface;

said guiding means including a pair of fixed, substantially horizontal guide members adjacent, respectively, lateral margins of said extended surface;

follower means attached to said shutters and cooperating with said guide members to position said shutters so that said extended surface generally matches a desired surface for said roof system; and sealing means including elongated, resilient members mounted in fixed locations adjacent said lateral margins of said extended surface, for engagement by the outer surfaces of said shutters when extended to provide a seal as the shutters reach said desired surface.

18. A retractable roof system for motor cars, said system comprising:

a plurality of nesting shutters; and means for guiding said shutters for movement between a nested position and an extended position in which each shutter overlaps an adjacent shutter and the outer surfaces of said shutters altogether define an essentially continuous, stepped, extended surface;

said guiding means including a pair of fixed guide members each including a guide slot, said guide members being laterally spaced adjacent the margins of said extended surface with said guide slots located substantially horizontal and substantially parallel;

follower means attached to said shutters and guided in said guide slots to locate said shutters so that said extended surface generally matches a substantially horizontal, desired surface for said roof system; and sealing means including elongated resilient sealing members mounted in fixed, substantially horizontal locations adjacent at least three margins of said extended surface, for engagement by the outer surfaces of said shutters when extended to provide a seal; and separate, elongated resilient sealing members carried by each shutter for engagement by an adjacent overlapping shutter to limit penetration of air and water through any spaces between said shutters where they overlap;

the combination of (a) said guiding means which locate said shutters (b) said sealing members engaging the outer surfaces of said shutters at the margins of said extended surface, and (c) said separate sealing members between said shutters providing a retractable roof structure insulated against air and water penetration and rattling of the shutters against each other and any neighboring roof members.

19. A retractable roof system for motor cars, said system comprising:

a plurality of nesting shutters;

means for guiding said shutters for movement between a nested position and an extended position in which each shutter overlaps an adjacent shutter and the outer surface of said shutters altogether define an essentially continuous, stepped, extended surface;

said guiding means including a pair of fixed linear guide members each adjacent one lateral margin of said extended surface, and each providing a substantially horizontal guide surface;

follower means attached to said shutters adjacent both ends thereof and cooperating with said guide surfaces to position said shutters so that said extended surface generally matches a desired surface for said roof system; and resilient means engaging said outer surfaces of said shutters adjacent at least three margins of said extended surface and providing a gasket for mounting in a motor car roof.

20. A retractable roof system for motor cars, said system comprising:

a plurality of nesting shutters, each of said shutters having a heel portion;

means for guiding said shutters for movement between a nested position in which the heel portions of successive shutters are retracted beneath the next preceeding shutter and an extended position in which the outer surface of preceeding shutters overlap the heel portions of successive shutters and the other surfaces of said shutters altogether define a substantially horizontal, essentially continuous, stepped, extended surface;

said guiding means including a pair of fixed guide members adjacent, respectively, the lateral margins of said extended surface;

follower means attached to said shutters and cooperating with said guide members to position said shutters so that said extended surface generally matches a desired surface contour for said roof system; and resilient means interposed between said overlapping portions and said heel portions to create a waterproof seal and to maintain spacing between said shutters.

21. The retractable roof system of claim 20, said heel portion comprising a groove along the length of said shutter, said resilient means comprising a strip having a resilient sealing portion and a tongue portion to be retained in said groove in said heel portion.

22. A retractable roof system for motor cars, said system comprising:

a plurality of nesting shutters, having a channel-shaped cross section with a heel portion and top and bottom portions and forming an interior recess;

means for guiding said shutters for movement between a nested position in which successive shutters are retracted into the interior recess of the next preceeding shutter and an extended position in which the top and bottom portions of preceeding shutters overlap the heel portion of successive shutters and the outer surfaces of said shutters altogether define a substantially horizontal, essentially continuous, stepped, extended surface;

said guiding means including a pair of fixed guide members adjacent, respectively, the lateral margins of said extended surface;

follower means attached to said shutters and cooperating with said guide member to position said shutters so that said extended surface generally matches a desired surface contour for said roof system;

first resilient means interposed and compressed between said overlapping top portion and said heel portions to inhibit water from entering between said shutters into the interior cavities of said shutters and to maintain spacing between said shutters; and second resilient means interposed and compressed between said overlapping portions and said heel portions to prevent water from leaving between said shutters from said interior cavities of said shutters and to maintain spacing between said shutters.

23. The retractable roof system of claim 22 said heel portion comprising top and bottom grooves along the length of said shutters, both of said resilient means comprising a resilient sealing portion and a tongue portion to fit into and be retained in said groove in said heel portion.

24. The retractable roof system of claim 22, the bottom portions of said shutters having an interior surface which converges toward the next succeeding shutter to further compress said second resilient means when the shutters are in the extended position.

25. The retractable roof system of claim 23, the resilient sealing portion of said first resilient means having a generally oval, hollow cross section.

26. The retractable roof system of claim 23, the resilient sealing portion of said second resilient means having in its cross section two depending legs from said tongue portion, one of said legs sloping toward the interior cavity of the preceding shutter, the other of said legs sloping away from the interior cavity of said preceding shutter.

27. The retractable roof system of claim 26, the bottom portions of said shutters having an interior surface which converges toward the next succeeding surface to further compress said other of said legs of said second resilient means when the shutters are in the extended positon.

28. A retractable roof system of claim 26, the resilient sealing portion of said second resilient sealing means comprising a third leg.

29. In combination a motor car having a partial stationary roof and at least one retractable roof panel system having extended and retracted positions, said roof panel system supplementing said partial stationary roof when in said extended position, said retractable roof system comprising:

a plurality of nesting shutters;

means for guiding said shutters for movement between a nested position and an extended position in which each shutter overlaps an adjacent shutter and the outer surfaces of said shutters altogether define an essentially continuous, stepped, extended surface;

said guiding means including a pair of fixed, guide members, each adjacent one lateral margin of said extended surface, and each providing a substantially horizontal guide surface;

follower means attached to said shutters adjacent both ends thereof and cooperating with said guide surfaces to position said shutters so that said extended surface generally matches a desired surface for said roof system; and resilient means engaging said outer surfaces of said shutters adjacent at least three margins of said extended surface and providing a gasket for mounting in said partial stationary roof.

30. The combination of claim 29, said partial stationary roof having a bar arranged along the center line of said motor car and front and rear transverse portions, the members of the partial stationary roof forming two roof openings, are of said retractable roof panel systems arranged to close each of said openings in the extended positions and to laterally retract to substantially open said openings in the retracted positions.

31. The retractable roof system of claim 30 the outboard shutter of each of said roof panel systems being a specially configured transition shutter to provide an interface between said roof panel system and the side portion of said motor car.

32. The retractable roof system of claim 31, said outboard shutters being generally trapezoidal to form generally trapezoidal extended surfaces.

33. The combination of claim 29, said partial stationary roof having a central opening therein, said retractable roof panel system arranged to close said openings in the extended position and to longitudinally retract to substantially open said opening in the retracted position.

34. The retractable roof system for motor cars in claim 1, at least a series of said shutters being successively shorter such that said extended surface has a curved profile.

35. A retractable roof system for motor cars, said system comprising:
a plurality of nesting shutters;
means for guiding said shutters for movement between a nested position and an extended position in which each shutter overlaps an adjacent shutter and the outer surfaces of said shutters altogether define a substantially linear essentially continuous, stepped, extended surface;

said guiding means including a pair of fixed guide members adjacent, respectively, the lateral margins of said extended surface;

follower means attached to said shutters and cooperating with said guide members to position said shutters so that said extended surface generally matches a desired surface for said roof system;

means to extend and retract all of said shutter members in a uniform fashion upon the extension or retraction of one of said shutters; and means for driving said shutters between said nested position and said extended position, said means comprising a pair of lead screws mounted for ration about a fixed axes respectively along the lateral margins of said surface, means for reversibly driving said lead screws, a pair of actuators connected respectively to the ends of one of said shutters, each of said actuators threadingly engaging one of said lead screws to translate with the rotation of said lead screws to extend and retract said shutters.

36. The retractable roof system of claim 35, said means for reversibly driving said lead screws comprising a drive shaft arrranged along one longitudinal margin of said extended surface, said drive shaft drivably engaging said lead screw, for the simultaneous driving thereof and means for reversibly driving said drive shaft.

37. The retractable roof system of claim 36, said means for reversibly driving said drive shaft comprising a reversible electric motor.

38. The retractable roof system of claim 27, said means for reversibly driving said drive shaft further comprising alternately operable manual operated means.

39. The retractable roof system of claim 35, the rates of translation of said actuators along said lead screw, being different to allow said shutters to form a generally rectangular nested configuration and a generally trapezoidal extended surface.

40. The retractable roof system of claim 35, each of said fixed guide members having an axial opening to accept one of said lead screws, to permit the unrestricted rotation of said lead screw and the unrestricted translation of said associated actuator.

* * * * *